US008209122B2

(12) United States Patent
Nichols et al.

(10) Patent No.: US 8,209,122 B2
(45) Date of Patent: Jun. 26, 2012

(54) SYSTEM AND METHOD FOR RENDERING VISIBLE FEATURES OF A TARGET LOCATION ON A SYNTHETIC FLIGHT DISPLAY

(75) Inventors: Troy Nichols, Peoria, AZ (US); Thea L. Feyereisen, Hudson, WI (US); Gang He, Morristown, NJ (US); Dave Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 736 days.

(21) Appl. No.: 12/413,202

(22) Filed: Mar. 27, 2009

(65) Prior Publication Data

US 2010/0250030 A1    Sep. 30, 2010

(51) Int. Cl.
G08G 5/02    (2006.01)
G01C 21/00    (2006.01)
(52) U.S. Cl. .................. 701/523; 701/516; 701/532
(58) Field of Classification Search .......... 701/516, 701/519, 523, 532, 538
See application file for complete search history.

(56) References Cited

U.S. PATENT DOCUMENTS

| 5,978,715 | A * | 11/1999 | Briffe et al. ........... 701/11 |
| 6,720,891 | B2 * | 4/2004 | Chen et al. ........... 340/969 |
| 6,822,624 | B2 * | 11/2004 | Naimer et al. ........... 345/9 |
| 7,308,343 | B1 | 12/2007 | Horvath et al. |
| 7,403,133 | B2 | 7/2008 | He et al. |
| 2003/0193410 | A1 * | 10/2003 | Chen et al. ........... 340/971 |
| 2003/0222795 | A1 * | 12/2003 | Holforty et al. ........... 340/968 |
| 2004/0046712 | A1 * | 3/2004 | Naimer et al. ........... 345/9 |
| 2004/0160354 | A1 | 8/2004 | Coldefy et al. |
| 2005/0190079 | A1 * | 9/2005 | He ........... 340/945 |
| 2007/0005199 | A1 * | 1/2007 | He ........... 701/16 |
| 2007/0088491 | A1 | 4/2007 | He |
| 2008/0180351 | A1 * | 7/2008 | He ........... 345/1.1 |

FOREIGN PATENT DOCUMENTS

FR    2886437 A1    12/2006
(Continued)

OTHER PUBLICATIONS

Appendix A. Edited by Ari M. Diacou. Jun. 30, 2011, unpublished. Uses work from World of Warcraft, © 2004-20011 Blizzard Entertainment Inc.*

(Continued)

*Primary Examiner* — Mark Hellner
*Assistant Examiner* — Ari M. Diacou
(74) *Attorney, Agent, or Firm* — Ingrassia Fisher & Lorenz, P.C.

(57) ABSTRACT

A flight deck display system for an aircraft or other vehicle includes a first data source of visual feature data that is indicative of visual features of a location of interest, a second data source of flight data for the aircraft, a processor architecture, and a display element. The processor architecture is operatively coupled to the first data source and to the second data source, and it is configured to process the visual feature data, process the flight data, and, based upon the visual feature data and the flight data, generate image rendering display commands. The display element receives the image rendering display commands and, in response thereto, renders a dynamic graphical representation of the location of interest using the visual feature data. The dynamic graphical representation of the location conveys an amount of visible detail that varies as a function of the flight data.

10 Claims, 8 Drawing Sheets

FOREIGN PATENT DOCUMENTS

WO  2006125725 A1  11/2006

OTHER PUBLICATIONS

EP Search Report, EP10154420.3-1232/2234088 dated Jan. 27, 2011.

Foyle, D.C.; HSCL Research: Taxiway Navigation and Situation Awareness System (T-NASA) Overview; NASA Human-Centered Systems Lab; last updated Apr. 10, 2006; retrieved from the Internet on Mar. 20, 2009 (http://human-factors.arc.nasa.gov/ihi/hcsl.inactive/T-NASA.html).

* cited by examiner

SYSTEM AND METHOD FOR RENDERING VISIBLE FEATURES OF A TARGET LOCATION ON A SYNTHETIC FLIGHT DISPLAY

TECHNICAL FIELD

Embodiments of the subject matter described herein relate generally to avionics systems such as flight display systems. More particularly, embodiments of the subject matter relate to a flight deck display system that generates a synthetic flight display that includes a graphical representation of a location of interest, such as an airport, using variable display characteristics.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may obstruct the current flight path of the aircraft. The perspective view provides a three-dimensional view of the vehicle flight plan and may include one or more of the above-mentioned features that are displayed on the lateral map, including the terrain information. In this regard, some modern flight deck display systems incorporate a synthetic terrain display, which generally represents a virtual or computer simulated view of terrain rendered in a conformal manner.

The primary perspective view used in existing synthetic vision systems emulates a forward-looking cockpit viewpoint. Such a view is intuitive and provides helpful visual information to the pilot and crew, especially during airport approaches. In this regard, synthetic display systems for aircraft are beginning to employ realistic simulations of airports that include details such as runways, taxiways, ground markings, buildings, etc. Although such a high level of detail is valuable and desirable when the aircraft is very close to the airport, it may not be necessary at other phases of the flight. For example, if the aircraft is more than a mile away from the airport, then the pilot and crew might only need to know the general location of the airport or the specific destination runway. Displaying additional features (such as other runways, ground markings, or landscape features) may be unnecessary and distracting. The display of such additional features can result in a cluttered and user-unfriendly synthetic flight display.

BRIEF SUMMARY

A method of displaying airport features on a flight deck display element of an aircraft is provided. The method renders a dynamic synthetic flight display on the flight deck display element during flight, and receives aircraft status data for the aircraft during flight. The method progressively displays features of an airport in the dynamic synthetic flight display during flight, such that at least one visually distinguishable characteristic of the features varies as a function of the aircraft status data.

Another method of displaying features of a target on a flight deck display element of an aircraft is provided. This method involves the rendering of a dynamic synthetic flight display on the flight deck display element during flight. The method also receives aircraft status data for the aircraft during flight, and displays a relatively low resolution graphical representation of the target in the dynamic synthetic flight display when the aircraft status data is indicative of a first trigger event. The method continues by displaying a relatively high resolution graphical representation of the target in the dynamic synthetic flight display when the aircraft status data is indicative of a second trigger event.

Also provided is a flight deck display system for an aircraft. The system includes a first data source of visual feature data that is indicative of visual features of a location of interest, a second data source of flight data for the aircraft, and a processor architecture operatively coupled to the first data source and to the second data source. The processor architecture is configured to process the visual feature data, process the flight data, and, based upon the visual feature data and the flight data, generate image rendering display commands. The system also includes a display element that receives the image rendering display commands and, in response thereto, renders a dynamic graphical representation of the location of interest using the visual feature data. The dynamic graphical representation of the location conveys an amount of visible detail that varies as a function of the flight data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
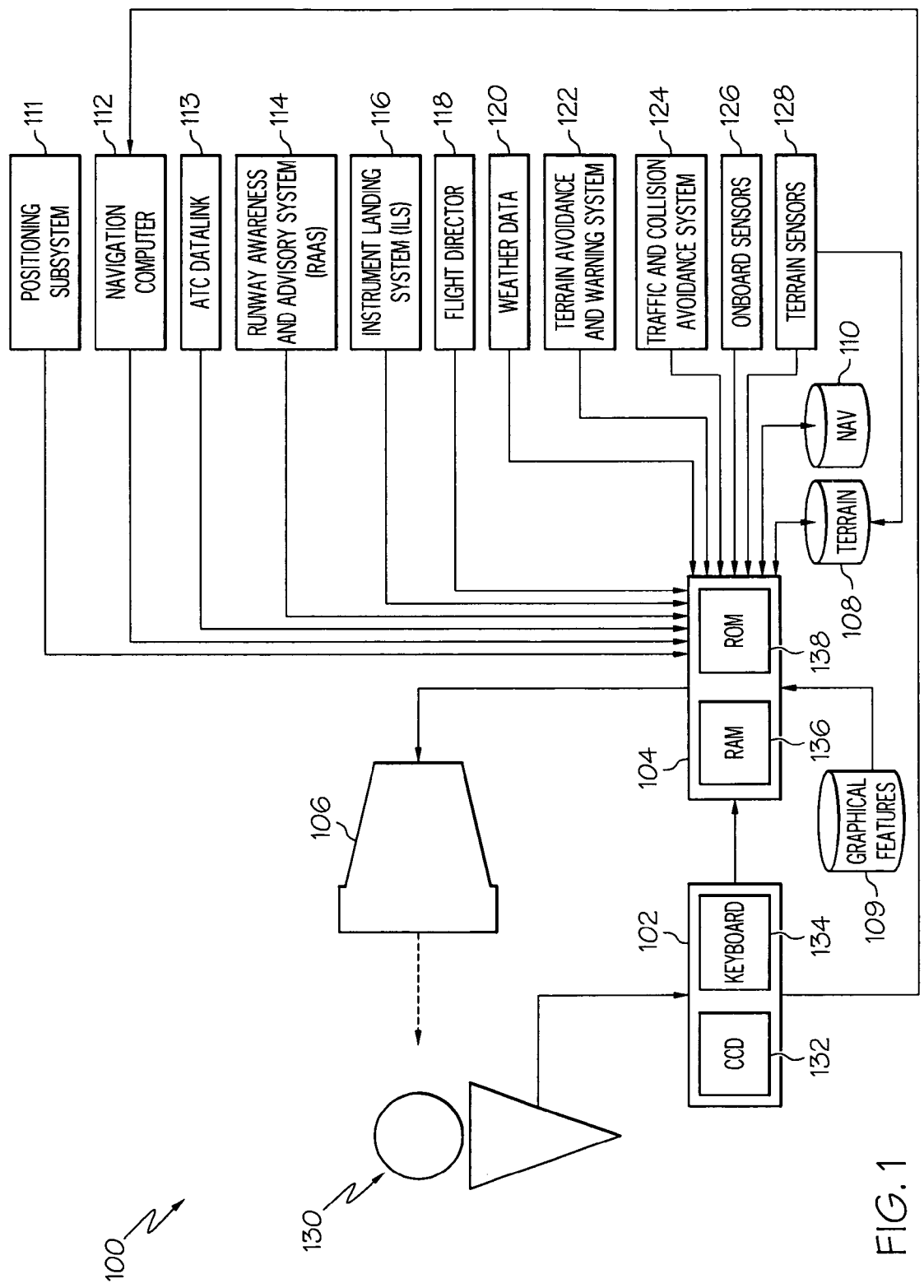
FIG. 1 a schematic representation of an embodiment of a flight deck display system.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

The system and methods described herein can be deployed with any vehicle, including aircraft, automobiles, spacecraft, watercraft, and the like. The preferred embodiments of the system and methods described herein represent an intelligent way to present visual airport information to a pilot or flight crew, based on operational need, safety factors, and/or cognitive parameters. The system preferably uses trigger points (which may be associated with certain aircraft status or flight data) to modulate, vary, and otherwise control the synthetic display and presentation of the airport. In some embodiments, detailed features of the airport are introduced or faded-in as the aircraft approaches the airport. This technique results in less display clutter because irrelevant or unimportant features and information are omitted from the synthetic flight display.

In one exemplary embodiment, airport informational requirements can be predefined and established for different phases of the flight. The phases of the flight can be defined using factors such as aircraft position, altitude, speed, vertical velocity, descent angle, lateral distance to the airport, alignment to the aircraft's longitudinal, vertical, and lateral axes, and pilot informational requirements. Event triggers can also be defined using the phase of flight parameters mentioned above. In this manner, the event triggers are associated with the progress and status of the flight. The event triggers are used to influence the manner in which the airport features are displayed, introduced, and/or rendered.

For example, as the aircraft flies down the final approach path, the runway and taxiway environment of the airport are faded in gradually. The runway is faded in before other features of the airport to facilitate runway alignment. Then, as the aircraft flies closer to the runway, other detail is faded in, such as the taxiway turnoffs, ramp areas, and ground markings. This allows the pilot to anticipate braking and turning requirements. The use of the smart de-cluttering intelligence can inhibit some airport features on final approach, such as taxiway signage. Inhibiting such features is tolerable where there are no associated operational requirements during that particular phase of the flight.

FIG. 1 depicts an exemplary flight deck display system 100 that generally includes, without limitation: a user interface 102; a processor architecture 104 coupled to user interface 102; and a display element 106 coupled to processor architecture 104. System 100 may also include, cooperate with, and/or communicate with a number of databases, sources of data, or the like. Moreover, system 100 may include, cooperate with, and/or communicate with a number of external subsystems as described in more detail below. For example, processor architecture 104 may cooperate with one or more of the following components, features, data sources, and subsystems, without limitation: one or more terrain databases 108; one or more graphical features databases 109; one or more navigation databases 110; a positioning subsystem 111; a navigation computer 112; an air traffic control (ATC) datalink 113; a runway awareness and advisory system (RAAS) 114; an instrument landing system (ILS) 116; a flight director 118; a source of weather data 120; a terrain avoidance and warning system (TAWS) 122; a traffic and collision avoidance system (TCAS) 124; one or more onboard sensors 126; and one or more terrain sensors 128.

User interface 102 is in operable communication with processor architecture 104 and is configured to receive input from a user 130 (e.g., a pilot) and, in response to the user input, supply command signals to processor architecture 104. User interface 102 may be any one, or combination, of various known user interface devices including, but not limited to, a cursor control device (CCD) 132, such as a mouse, a trackball, or joystick, one or more buttons, switches, or knobs. In the depicted embodiment, user interface 102 includes CCD 132 and a keyboard 134. The user 130 manipulates CCD 132 to, among other things, move cursor symbols that might be rendered at various times on display element 106, and the user 130 may manipulate keyboard 134 to, among other things, input textual data. As depicted in FIG. 1, user interface 102 may also be utilized to enable user interaction with navigation computer 112, the flight management system, and/or other features and components of the aircraft.

Processor architecture 104 may utilize one or more known general-purpose microprocessors or an application specific processor that operates in response to program instructions. In the depicted embodiment, processor architecture 104 includes or communicates with onboard RAM (random access memory) 136, and onboard ROM (read only memory) 138. The program instructions that control processor architecture 104 may be stored in either or both RAM 136 and ROM 138. For example, the operating system software may be stored in ROM 138, whereas various operating mode software routines and various operational parameters may be stored in RAM 136. It will be appreciated that this is merely exemplary of one scheme for storing operating system software and software routines, and that various other storage schemes may be implemented. It will also be appreciated that processor architecture 104 may be implemented using various other circuits, not just a programmable processor. For example, digital logic circuits and analog signal processing circuits could also be used.

Processor architecture 104 is in operable communication with terrain database 108, graphical features database 109, navigation database 110, and display element 106, and is coupled to receive various types of data, information, commands, signals, etc., from the various sensors, data sources, instruments, and subsystems described herein. For example, processor architecture 104 is suitably configured to obtain and process real-time aircraft status data (e.g., avionics-related data) as needed to generate a graphical synthetic perspective representation of terrain in a primary display region. The aircraft status or flight data is also utilized to influence the manner in which graphical features (associated with the data maintained in graphical features database 109) of a location of interest are rendered during flight. In this regard, graphical features database 109 may be considered to be a source of visual feature data that is indicative of visual features of a location of interest.

For this embodiment, graphical features database 109 is an onboard feature that contains pre-loaded graphical features data. In alternate embodiments, some or all of the graphical features data can be loaded into graphical features database 109 during flight. Indeed, some graphical features data could be received by the aircraft in a dynamic manner as needed. The graphical features data accessed by processor architecture 104 is indicative of displayable visual features of a location of interest, a target of interest, a destination, a geographic region, or the like. In the preferred embodiment described herein, the graphical features data represents airport feature data that is indicative of certain visible and displayable features of one or more airports, including the destination airport of the aircraft. In practice, the airport feature data can be associated with any viewable portion, aspect, marking, structure, building, geography, and/or landscaping located at, on, in, or near an airport. The processing and rendering of the graphical features data will be described in more detail below with reference to FIGS. 2-8.

For example, the airport feature data could be related to any of the following visually distinct features, without limitation: a runway; runway markings and vertical signage; a taxiway; taxiway markings and vertical signage; a ramp area and related markings; parking guidance lines and parking stand lines; a terminal or concourse; an air traffic control tower; a building located at or near the airport; a landscape feature located at or near the airport; a structure located at or near the airport; a fence; a wall; a vehicle located at or near the airport; another aircraft located at or near the airport; a light pole located at or near the airport; a power line located at or near the airport; a telephone pole located at or near the airport; an antenna located at or near the airport; construction equipment, such as a crane, located at or near the airport; a construction area located at or near the airport; trees or structures or buildings located around the airport perimeter; and bodies of water located in or around the airport. More particularly, runway-specific feature data could be related to, or indicate, without limitation: arresting gear location; blast pad; closed runway; land and hold short operation locations; rollout lighting; runway centerlines; runway displaced thresholds; runway edges; runway elevation; runway end elevation; runway exit lines; runway heading; runway hold short lines; runway hotspots; runway intersection; runway labels; runway landing length; runway length; runway lighting; runway markings; runway overrun; runway shoulder; runway slope; runway stopways; runway surface information; runway that ownship is approaching; runway threshold; runway weight bearing capacity; and runway width. Taxiway-specific feature data could be related to, or indicate, without limitation: clearway; closed taxiway; ILS critical areas; ILS hold lines; low visibility tax route; preferred taxiway; SMGS taxiways; taxiway direction indicator labels; taxiway high speed; taxiway intersection labels; taxiway bearing strength (when less than associated runway); taxiway centerlines; taxiway edges or boundaries; taxiway exit; taxiway guidance lines; taxiway hold short lines; taxiway hotspot; taxiway labels; taxiway shoulder; and taxiway width. Geographical feature data could be related to, or indicate, without limitation: air traffic control boundaries; airport beacons (vertical point object); airport name; airport notes; airport reference point; airport surface lighting; airport terrain features; aprons; areas under construction; building identification; buildings; control tower; deicing areas; FBO; fire station; frequency areas; grassy areas; hangars; helicopter final approach and take off areas; helicopter landing pads; helicopter touchdown or liftoff areas; helipad thresholds; holding pens; latitude/longitude; magnetic variation; non-movement areas; north indication; on airport navaids; parking stand area; parking stand line; parking stand locations; penalty box; pole line; railroads; ramp areas; restricted areas; roads; service roads; spot elevations; stand guidance lines; survey control points; terminal buildings; trees; vertical line structures; vertical point structures; vertical polygonal structures; water features; wind cone; and wind sock.

In certain embodiments, processor architecture 104 is configured to respond to inertial data obtained by onboard sensors 126 to selectively retrieve terrain data from terrain database 108 or terrain sensor 128, to selectively retrieve navigation data from navigation database 110, and/or to selectively retrieve graphical features data from graphical features database 109, where the graphical features data corresponds to the location or target of interest. Processor architecture 104 can also supply appropriate display commands to display element 106, so that the retrieved terrain, navigation, and graphical features data are appropriately displayed on display element 106. Processor architecture 104 may be further configured to receive real-time (or virtually real-time) airspeed, altitude, attitude, waypoint, and/or geographic position data for the aircraft and, based upon that data, generate image rendering display commands associated with the display of terrain.

Display element 106 is used to display various images and data, in both a graphical and a textual format, and to supply visual feedback to the user 130 in response to the user input commands supplied by the user 130 to user interface 102. It will be appreciated that display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. Display element 106 may additionally be based on a panel mounted display, a HUD projection, or any known technology. In an exemplary embodiment, display element 106 includes a panel display, and display element 106 is suitably configured to receive image rendering display commands from processor architecture 104 and, in response thereto, display element 106 renders a synthetic flight display having a perspective view of terrain corresponding to a flight deck viewpoint. Moreover, display element 106 also renders features of the location of interest in a progressive, variable, or modulated manner. To provide a more complete description of the operating method that is implemented by system 100, a general description of exemplary flight displays and various graphical features rendered thereon will be provided below with reference to FIGS. 3-8.

As FIG. 1 shows, processor architecture 104 is in operable communication with the source of weather data 120, TAWS 122, and TCAS 124, and is additionally configured to generate, format, and supply appropriate display commands to display element 106 so that the avionics data, weather data 120, data from TAWS 122, data from TCAS 124, and data from the previously mentioned external systems may also be selectively rendered in graphical form on display element 106. The data from TCAS 124 can include Automatic Dependent Surveillance Broadcast (ADS-B) messages.

Terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in terrain database 108 can be pre-loaded by external data sources or provided in real-time by terrain sensor 128. Terrain sensor 128 provides real-time terrain data to processor architecture 104 and/or terrain database 108. In one embodiment, terrain data from terrain sensor 128 is used to populate all or part of terrain database 108, while in another embodiment, terrain sensor 128 provides information directly, or through components other than terrain database 108, to processor architecture 104.

In another embodiment, terrain sensor 128 can include visible, low-light TV, infrared, lidar, or radar-type sensors that collect and/or process terrain data. For example, terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in terrain database 108 or processed for display on display element 106.

In one embodiment, the terrain data provided to processor architecture 104 is a combination of data from terrain database 108 and terrain sensor 128. For example, processor architecture 104 can be programmed to retrieve certain types of terrain data from terrain database 108 and other certain types of terrain data from terrain sensor 128. In one embodiment, terrain data retrieved from terrain sensor 128 can include moveable terrain, such as mobile buildings and systems. This type of terrain data is better suited for terrain sensor 128 to provide the most up-to-date data available. For example, types of information such as waterbody information and geopolitical boundaries can be provided by terrain database 108. When terrain sensor 128 detects, for example, a waterbody, the existence of such can be confirmed by terrain database 108 and rendered in a particular color such as blue by processor architecture 104.

Navigation database 110 includes various types of navigation-related data stored therein. In preferred embodiments, navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by terrain sensor 128 and/or terrain database 108 can be displayed with navigation data such as waypoints, airports, etc. from navigation database 110, superimposed thereon.

Although terrain database 108, graphical features database 109, and navigation database 110 are, for clarity and convenience, shown as being stored separate from processor architecture 104, all or portions of these databases 108, 109, 110 could be loaded into the onboard RAM 136, stored in ROM 138, or integrally formed as part of processor architecture 104. Terrain database 108, graphical features database 109, and navigation database 110 could also be part of a device or system that is physically separate from system 100.

Positioning subsystem 111 is suitably configured to obtain position data for the aircraft. In practice, positioning subsystem 111 monitors the current position of the aircraft in real-time, and the real-time position data can be used by one or more other subsystems, processing modules, or equipment on the aircraft (e.g., navigation computer 112, RAAS 114, ILS 116, flight director 118, TAWS 122, or TCAS 124). In certain embodiments, positioning subsystem 111 is realized using global positioning system (GPS) technologies that are commonly deployed in avionics applications. Thus, the position data obtained by positioning subsystem 111 may represent the latitude and longitude of the aircraft in an ongoing and continuously updated manner.

The avionics data that is supplied from onboard sensors 126 includes data representative of the state of the aircraft such as, for example, aircraft speed, altitude, attitude (i.e., pitch and roll), heading, groundspeed, turn rate, etc. Onboard sensors 126 can include MEMS-based, ADHRS-related, or any other type of inertial sensor. Onboard sensors 126 may include at least one sensor that is suitably configured to obtain altitude data for the aircraft, where the altitude data represents the current real-time altitude of the aircraft. As understood by those familiar with avionics instruments, the aircraft status data is preferably updated in a continuous and ongoing manner.

The weather data 120 supplied to processor architecture 104 is representative of at least the location and type of various weather cells. The data supplied from TCAS 124 includes data representative of other aircraft in the vicinity, which may include, for example, speed, direction, altitude, and altitude trend. In a preferred embodiment, processor architecture 104, in response to the TCAS data, supplies appropriate display commands to display element 106 such that a graphic representation of each aircraft in the vicinity is displayed on display element 106. TAWS 122 supplies data representative of the location of terrain that may be a threat to the aircraft. Processor architecture 104, in response to the TAWS data, preferably supplies appropriate display commands to display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to processor architecture 104 for display on display element 106. In the depicted embodiment, these external systems include a flight director 118, an instrument landing system (ILS) 116, a runway awareness and advisory system (RAAS) 114, and a navigation computer 112. Flight director 118, as is generally known, supplies command data representative of commands for piloting the aircraft in response to flight crew entered data, or various inertial and avionics data received from external systems. The command data supplied by flight director 118 may be supplied to processor architecture 104 and displayed on display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. ILS 116 onboard the aircraft receives these signals and supplies appropriate data to the processor for display of, for example, an ILS feather (not shown in FIG. 1) on the display element 106. The ILS feather represents two signals, a localizer signal that is used to provide lateral guidance, and a glide slope signal that is used for vertical guidance.

RAAS 114 provides improved situational awareness to help lower the probability of runway incursions by providing timely aural advisories to the flight crew during taxi, takeoff, final approach, landing and rollout. RAAS 114 uses GPS data to determine aircraft position and compares aircraft position to airport location data stored in navigation database 110 and/or in graphical features database 109. Based on these comparisons, RAAS 114, if necessary, issues appropriate aural advisories. Aural advisories, which may be issued by RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

Navigation computer 112 is used, among other things, to allow the user 130 to program a flight plan from one destination to another. Navigation computer 112 may be in operable communication with flight director 118. As was mentioned above, flight director 118 may be used to automatically fly, or assist the user 130 in flying, the programmed route. Navigation computer 112 is in operable communication with various databases including, for example, terrain database 108, and navigation database 110. Processor architecture 104 may receive the programmed flight plan data from navigation computer 112 and cause the programmed flight plan, or at least portions thereof, to be displayed on display element 106.

ATC datalink 113 is utilized to provide air traffic control data to system 100, preferably in compliance with known standards and specifications. Using ATC datalink, processor architecture 104 can receive air traffic control data from ground based air traffic controller stations and equipment. In turn, system 100 can utilize such air traffic control data as needed.

In operation, a flight deck display system as described herein is suitably configured to process current status/flight data for the host aircraft and generate a synthetic flight display having graphical features and characteristics that are influenced by the current status data. In particular, the manner in which a target location (such as an airport) is displayed is influenced or triggered by the flight data. Visible and displayable features of the target location can be gradually introduced, faded in, or progressively displayed in an intelligent and intuitive manner that avoids display clutter and in a manner that appears natural to the pilot and crew.

Figure 2:
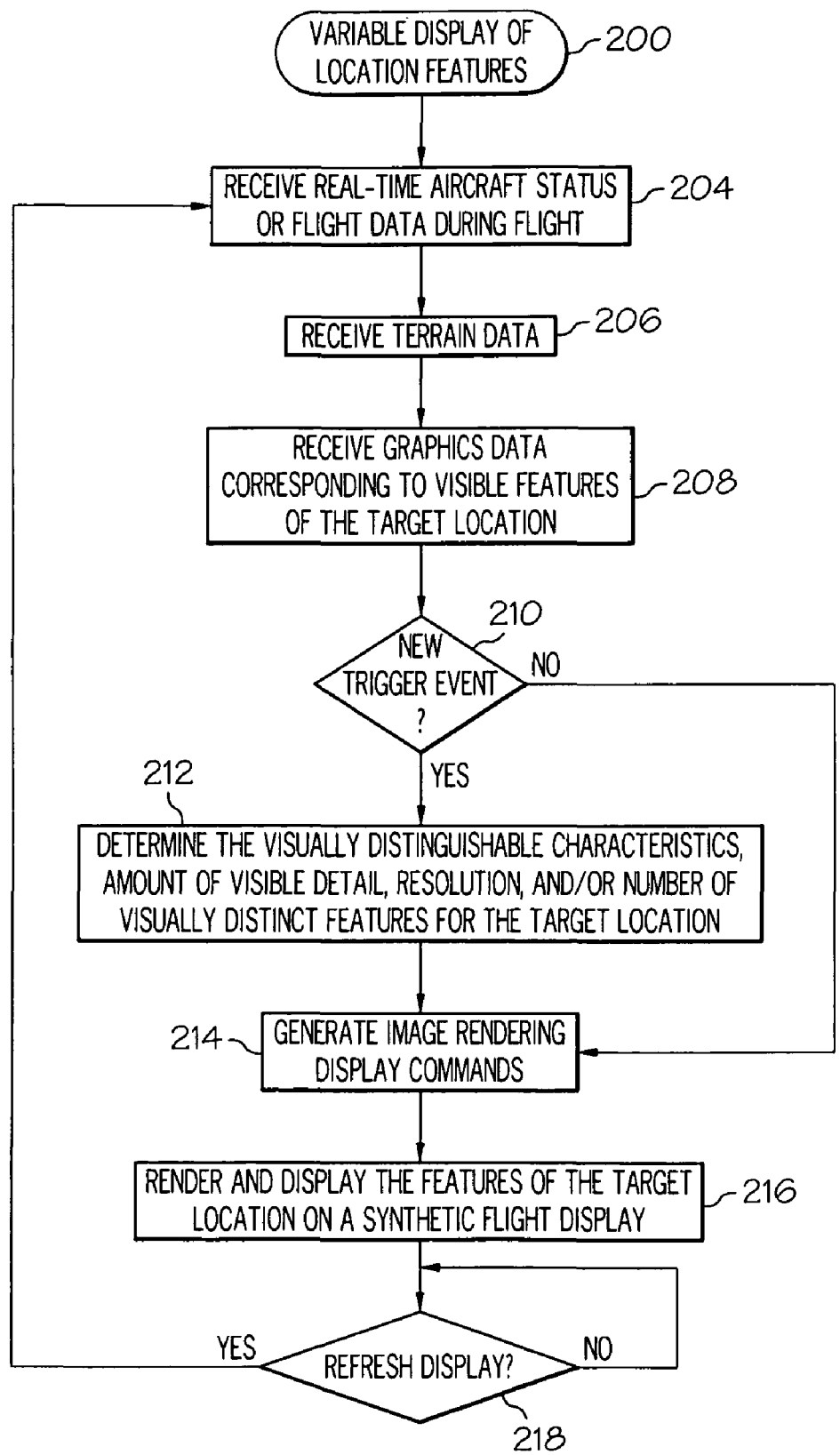
FIG. 2 is a flow chart that illustrates an exemplary embodiment of a process related to the variable display of location features.

FIG. 2 is a flow chart that illustrates an exemplary embodiment of a process 200 related to the variable display of location features. The various tasks performed in connection with process 200 may be performed by software, hardware, firmware, or any combination thereof. For illustrative purposes, the following description of process 200 may refer to elements mentioned above in connection with FIG. 1. In practice, portions of process 200 may be performed by different elements of the described system, e.g., the processing architecture or the display element. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein.

Process 200 can be performed in a virtually continuous manner at a relatively high refresh rate. For example, an iteration of process 200 could be performed at a rate of 12-40 Hz (or higher) such that the flight display will be updated in real-time or substantially real time in a dynamic manner. This particular embodiment of process 200 receives the real-time aircraft status/flight data during operation of the host aircraft (task 204). This current status data may include, among other items: airspeed data; groundspeed data; altitude data; vertical speed data; radio altitude data; pitch data; geographic position data; distance data indicative of a distance between the aircraft and the location of interest or distance to another ground or air vehicle; roll data; turning rate data; heading data; aircraft track data; autoflight and autopilot status data; flap configuration data; spoilers or speed brake data; weight on wheels data; APU status data; aircraft lights data (navigation lights, anti-collision beacon, etc.); parking brake status data; N1 or EPR data (thrust parameter); transponder status data; radar mode status data; landing gear status data; COM 1, COM 2 and COM 3 tuning data; distance to required track and distance to localizer data; deviation from desired track or localizer data; vertical distance to altitude pre-selector position; vertical time to next waypoint; time and distance to next waypoint; environmental data; flight path angle; throttle position; trim settings; body and earth accelerations; and the like. Process 200 may also receive, obtain, or access terrain data corresponding to terrain proximate the aircraft (task 206). As mentioned above, this terrain data might represent the current image of the terrain as perceived from the cockpit view. The terrain data may also represent an image of terrain from a different perspective, e.g., a third person view of the host aircraft, or a non-cockpit view.

In preferred embodiments, process 200 also receives, obtains, or accesses graphical features data (e.g., airport feature data, target feature data, visual feature data, or the like), which might be maintained onboard the aircraft (task 208). As explained above, this graphical features data corresponds to, represents, or is indicative of certain visible and displayable features of the location of interest. The specific graphical features data that will be used to render a given synthetic flight display will depend upon various factors, including the current flight data. The current set of aircraft flight/status data is then processed in an appropriate manner to determine whether a new trigger event is indicated (query task 210).

As used here, a "trigger event" occurs when an attribute (or a combination of attributes) of the aircraft flight/status data or environmental data satisfies certain threshold criteria that is related to the manner in which the location of interest and/or object is rendered on the synthetic flight display. A given flight plan may have any number of trigger events associated therewith. In certain embodiments, the trigger events for a given flight plan and/or for a given approach to an airport can be determined a priori and, therefore, programmed with the flight plan itself. As one simple example, a trigger event could be related to airspeed such that different trigger events correspond to different airspeed values. Thus, a first trigger event may be indicated when the current airspeed drops below a first threshold value, and a subsequent second trigger event may be indicated when the current airspeed drops even further, below a second threshold value. Another simple example is based on a "distance to go" quantity. Thus, a first trigger event may be indicated when the aircraft is five miles away from its destination, a second trigger event may be indicated at a distance to go of four miles, and so on. Other simple trigger events could be based on any one of the various types of flight data mentioned above. More complex trigger events could be based on any combination of two or more attributes or types of the flight data. For example, a trigger event may be dependent upon a specific combination of altitude, airspeed, and distance to go, where all three of the attributes must satisfy threshold criteria before that trigger event is indicated. A practical embodiment could leverage pre-identified "phases of flight" utilized by flight management systems, where a given phase of flight is calculated based upon various aircraft data, geographic data, etc. For example, a flight management system could define any number, such as 24, different phases, and these phases could be employed here as trigger events that impact the display characteristics. Those skilled in the art will appreciate that the number and complexity of the trigger events may vary from one embodiment to another, to suit the needs of the particular application and/or in accordance with the desired flight plan and location of interest.

As described in more detail below, a sequence of trigger events will influence how graphical features of the target location will appear, be introduced, be modulated, and otherwise be displayed in the synthetic flight display. Therefore, if query task 210 detects a new trigger event, then process 200 will determine how best to render the target location (task 212). In practice, task 212 might first determine whether or not any portion of the target location will be displayed. If, for example, the detected trigger event occurs when the aircraft is many miles away from the target location, then task 212 may determine that the synthetic flight display should be free of any graphical features related to the target location. Assuming some portion of the target location is to be rendered, then task 212 might determine the visually distinguishable characteristics for the target location (or the portion thereof), where the visually distinguishable characteristics vary as a function of the aircraft flight/status data. In this context, a visually distinguishable characteristic may be related to one or more of the following traits, without limitation: color; brightness; transparency level; translucency level; fill pattern; shape; size; flicker pattern; focus level; sharpness level; clarity level; shading; dimensionality (2D or 3D); resolution; and outline pattern. These visually distinguishable characteristics can be used to fade or introduce the target into the display in a gradual manner. For example, an airport runway could gradually fade in from being fully transparent to being fully opaque or solid as the aircraft approaches the airport.

Alternatively (or additionally), task 212 could determine a particular amount of visible detail for the location of interest, where the amount of visible detail varies as a function of the aircraft flight/status data. In this regard, adding additional visible detail may require accessing more of the available graphical features data for the location of interest. For example, when the aircraft is relatively far away from a destination airport, task 212 might determine that a relatively low amount of visible detail is sufficient, resulting in a simplified rendition of the airport (such as a square or a rectangle). On the other hand, when the aircraft is relatively close to the destination airport, task 212 might determine that a relatively high amount of visible detail is needed, resulting in a more complex and accurate rendering of the airport (including multiple runways, markings, buildings, etc.). In other words, task 212 could be associated with the determination of different display resolutions for the target location, where a relatively low resolution corresponds to less detail and less real-world accuracy, and a relatively high resolution corresponds to more detail and more real-world accuracy.

Alternatively (or additionally), task 212 could determine a number of visibly distinct features to display for the location of interest, where the number of visibly distinct features varies as a function of the aircraft flight/status data. For example, the graphical features data for an airport might identify or contain hundreds of different visibly distinct features that can be rendered on the synthetic flight display. Of course, all of those features need not be displayed at all times. Accordingly, when the aircraft is far away from the airport, only a limited number of the available features will be selected for display. However, when the aircraft is near to the airport, task 212 could determine that a higher number of the visibly distinct features ought to be displayed. Notably, a variable display resolution for the location of interest might be implemented by changing the number of visibly distinct features that are rendered with the synthetic flight display.

Alternatively (or additionally), task 212 could selectively display different amounts of detail for certain specified areas of an airport. Thus, a relatively high amount of detail could be rendered for more important features, while a relatively low amount of detail could be rendered for less important features. For example, a first portion of the airport, such as the planned taxi route or other intended path, could be displayed with more features, more detail, or in an otherwise highlighted manner. In contrast, a second portion of the airport, such as other runways, outlying structures, or other taxiways, could be displayed with less features, less detail, or in an otherwise muted or de-emphasized manner.

Alternatively (or additionally), task 212 could display a graphical representation of a taxiway using visually distinguishable characteristics that are indicative of taxi status of the vehicle. For example, the intended taxiway could be rendered in a highlighted manner for guidance. If, however, the aircraft is travelling too fast to make the intended taxiway (or to turn onto an intended path), then the details and displayed features of the originally planned path could be changed, modified, or highlighted differently as a warning to the pilot. In this regard, features of the airport or target location can be rendered in a visually distinguishable manner that conveys additional information to the flight crew, e.g., alarms, alerts, warnings, reminders, or the like.

Once task 212 determines the manner in which the location of interest will be displayed, process 200 can generate applicable image rendering display commands that correspond to the synthetic flight display and that correspond to the location of interest (task 214). The image rendering display commands are based upon or otherwise influenced by the current data—the graphical display characteristics are dependent upon the current aircraft flight/status data, including the terrain data and the aircraft data. Importantly, the display characteristics of the location of interest are also influenced by the current aircraft flight/status data, as explained previously. Task 214 is also performed if query task 210 does not detect a new trigger event. This allows process 200 to continue rendering the synthetic flight display without altering the variable display characteristics of the target location (in practice, other display parameters of the target location may be updated, e.g., orientation, size, and perspective, in a manner akin to updating surrounding terrain).

The image rendering display commands are then used to control the rendering and display of a dynamic synthetic flight display (task 216) on the flight deck display element. The dynamic synthetic flight display will preferably include a synthetic perspective view of terrain and a rendering of at least some features or elements of the location of interest (assuming that the location of interest is close enough to trigger a display). In certain embodiments, the image rendering display commands may also be used to control the rendering of additional graphical features, such as flight instrumentation symbology, flight data symbology, or the like.

If it is time to refresh the display (query task 218), then process 200 leads back to task 204 to obtain the most current data. If not, then the current state of the synthetic flight display is maintained. The relatively high refresh rate of process 200 results in a relatively seamless and immediate updating of the display. Thus, process 200 is iteratively repeated to update the graphical representations of the terrain, the target/location of interest, and other graphical elements of the synthetic flight display. In practice, process 200 can be repeated indefinitely and at any practical rate to support continuous and dynamic updating and refreshing of the display. Frequent updating of the displays enables the flight crew to obtain and respond to the current flight situation in virtually real-time.

Notably, while process 200 iteratively executes during the flight, it results in the progressive, incremental, gradual, or varied display of features of the location of interest (e.g., an airport) in the dynamic synthetic flight display, where the progressive, incremental, or variable characteristics are controlled as a function of the aircraft status or flight data. In one preferred embodiment (see FIGS. 3-8), certain visible features of a destination airport are progressively displayed by gradually fading-in airport features as a function of the aircraft status data. In this regard, the amount of visible detail of the airport preferably increases as the aircraft approaches the airport. In alternate embodiments, certain visible features of an airport are progressively displayed by incrementally displaying a plurality of airport features as a function of the aircraft status data. Thus, graphical features can be added as the aircraft approaches the airport. For example, at a distance to go of five miles, the entire airport and its surrounding area might be depicted as a simple rectangle or a dot. At a distance to go of less than a mile, however, runways and buildings of the airport might be displayed.

While process 200 iteratively executes during operation of the aircraft, it might result in the display of the target location in different resolutions. For example, upon initial approach, a relatively low resolution depiction of a destination location could be displayed. Thereafter, upon final approach, a relatively high resolution depiction of the destination location could be displayed. Any number of different resolutions could be utilized in a virtually continuous (or discontinuous) manner, resulting in a display resolution of the destination location that varies as a function of the aircraft flight or status data. The displayed resolution may be associated with the amount of visible detail, the number of graphical features used to render the destination location, the manner in which visually distinguishable characteristics (e.g., transparency, color, brightness, etc.) are modulated, or the like.

Although the system and methods described herein can be utilized with any type of vehicle to display any desired target or location of interest, certain preferred embodiments utilize the system and methods in an aircraft deployment to control the manner in which an airport is displayed upon approach. In this regard, FIGS. 3-8 are graphical representations of a synthetic flight display at different times during approach to an airport. FIGS. 3-8 represent one of many possible deployment scenarios, and the following description of FIGS. 3-8 is not intended to limit or otherwise restrict the scope or application of the subject matter presented herein.

Figure 3:
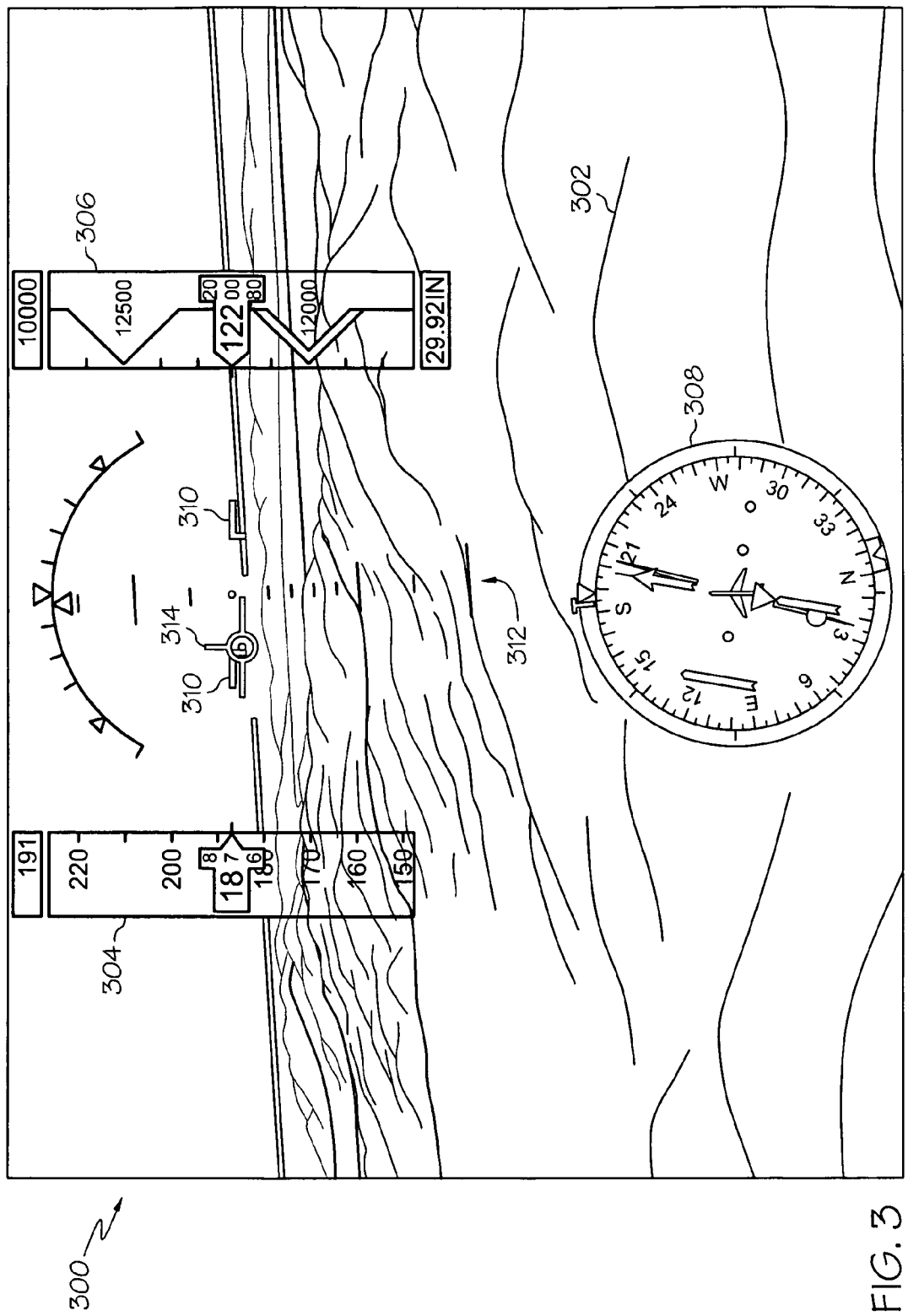
FIGS. 3-8 are graphical representations of a synthetic flight display at different times during approach to an airport.

FIG. 3 depicts an exemplary synthetic flight display 300 at a time corresponding to the terminal area descent phase of the flight. At this time, the destination airport is not within normal eyesight range and, therefore, synthetic flight display 300 does not include any graphical features associated with the airport. It should be appreciated that synthetic flight display 300 as depicted in FIG. 3 represents the state of a dynamic display frozen at one particular time, and that the display element hardware can be continuously refreshed in response to the current flight status, environmental conditions, location of the aircraft, etc. The illustrated synthetic flight display 300 includes several features that are graphically rendered. These features include, without limitation: a synthetic perspective view of terrain 302 that is based on the terrain data being processed by the system; an airspeed tape 304; an altimeter tape 306; a horizontal situation indicator 308; an aircraft reference marker 310; a pitch ladder scale 312; and a flight path marker 314. In practice, synthetic flight display 300 may include any number of additional graphical elements, e.g., flight data, numerical information, pilot guidance elements, trend data, and the like. For the sake of clarity, simplicity, and brevity, such additional graphical elements are not shown or described here.

Terrain 302 is rendered in a perspective or three dimensional view that corresponds to a flight deck (cockpit) viewpoint. In other words, terrain 302 is displayed in a graphical manner that simulates the vantage point of a person in the cockpit of the aircraft. Thus, features of terrain 302 are displayed in a conformal manner, relative to the earth. For example, the relative elevations and altitudes of features in terrain 302 are displayed in a virtual manner that emulates reality. Moreover, as the aircraft navigates (e.g., turns, ascends, descends, rolls, etc.), the graphical representation of terrain 302 and other features of the perspective display can shift to provide a continuously updated virtual representation for the flight crew. It should be appreciated that the perspective view associated with synthetic flight display 300 need not always include a perspective view of terrain 302. For example, in the absence of terrain data, the perspective view of the display may appear flat, blank, or otherwise void of conformal terrain graphics.

Figure 4:
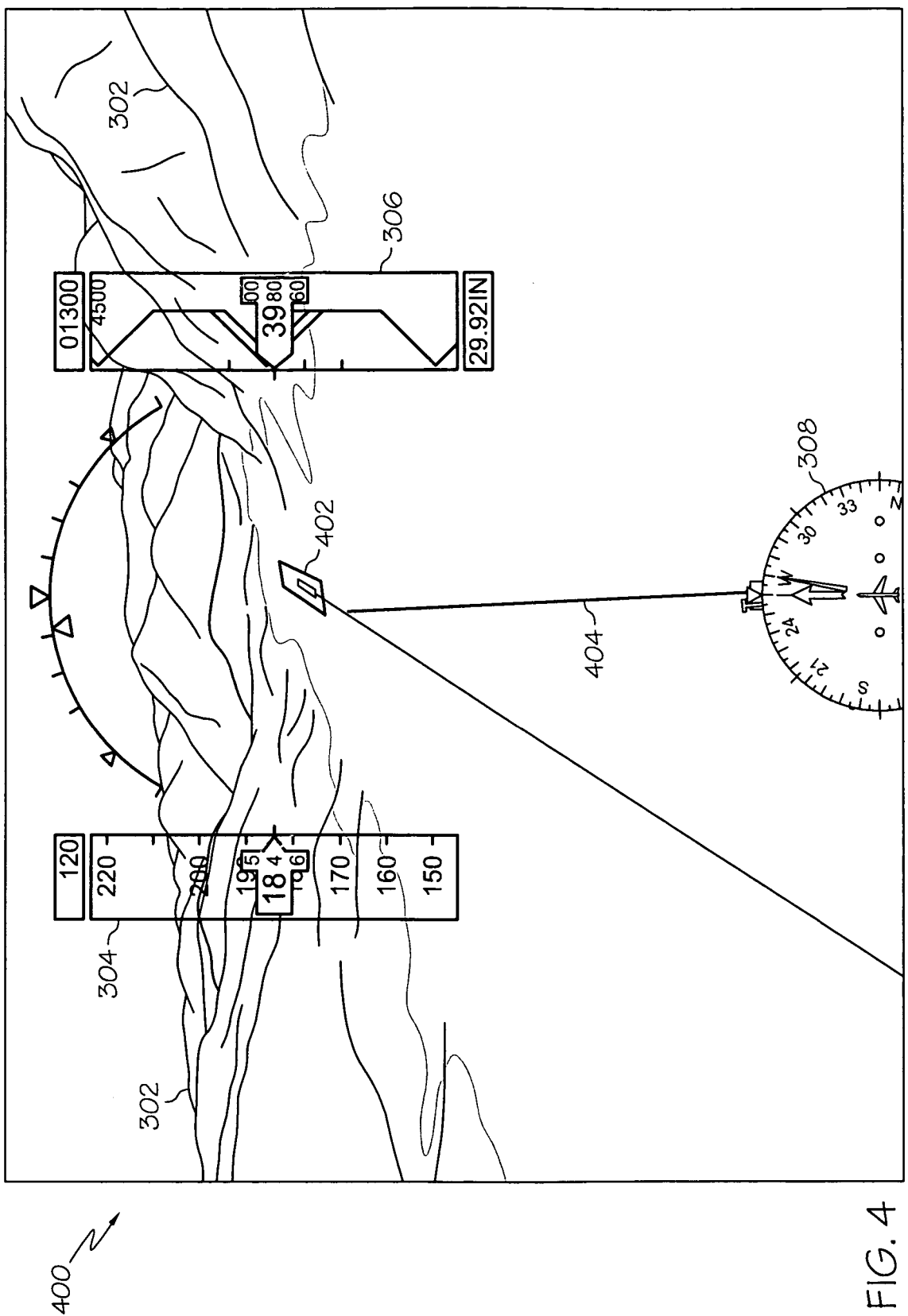

FIG. 4 depicts an exemplary synthetic flight display 400 at a time when the aircraft is turning to prepare for the final approach phase of the flight. At this time, the destination airport is within range and, therefore, synthetic flight display 400 will include at least some graphical features associated with the airport. In other words, between the time corresponding to FIG. 3 and the time corresponding to FIG. 4, at least one trigger event has been detected in the aircraft status data, prompting the system to render at least some detail for the airport. For clarity and ease of illustration, some of the graphical elements shown in FIG. 3 are omitted from FIG. 4.

Notably, at the time corresponding to synthetic flight display 400, a landing area 402 has begun to fade into view. At this stage of the flight, additional details related to the airport, the runway, and surrounding structures need not be presented to the pilot and crew. Accordingly, the system intelligently and intentionally displays less than the full amount of available detail at this time. For the illustrated embodiment, landing area 402 is rendered as a simple rectangular element. In addition, synthetic flight display 400 may render a runway approach path 404, which indicates the desired approach to landing area 402.

Figure 5:
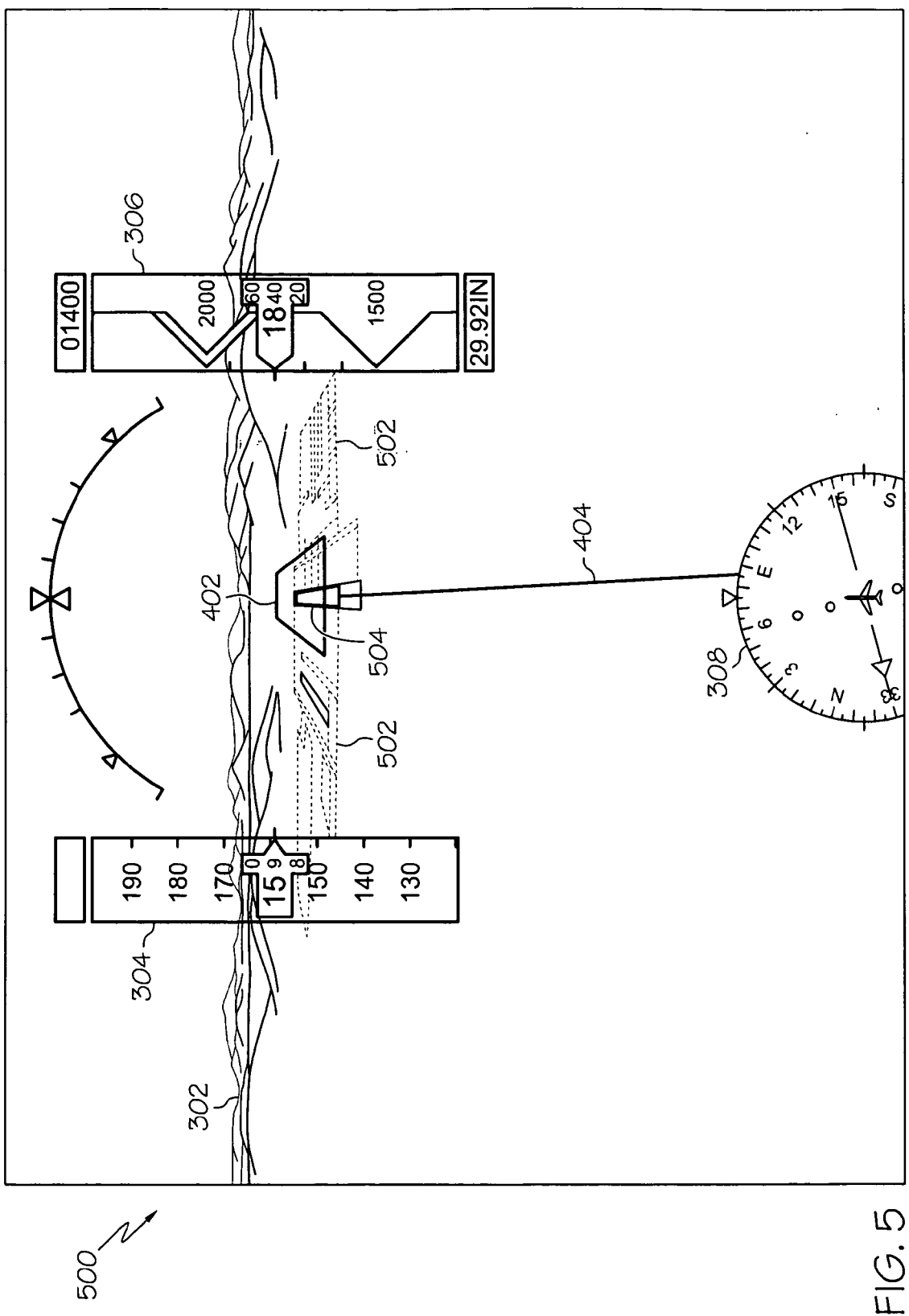

FIG. 5 depicts an exemplary synthetic flight display 500 at a time corresponding to the final approach fix phase of the flight. For clarity and ease of illustration, some of the graphical elements shown in FIG. 3 are omitted from FIG. 5. At this time, landing area 402 and runway approach path 404 remain displayed (although their graphical representations have been updated to reflect the current geographic position of the aircraft). At this distance, the system beings to fade in additional features 502 of the airport and/or runway. These additional features 502 may represent, for example, other runways, taxiways, ramp areas, buildings, walls, or other structures. Moreover, synthetic flight display 500 now renders a runway 504 that corresponds to the destination runway for the aircraft. Thus, between the time corresponding to FIG. 4 and the time corresponding to FIG. 5, at least one trigger event has been detected in the aircraft status data, prompting the system to render the additional features 502 and runway 504.

This particular embodiment of the display system uses variable transparency characteristics to gradually fade graphical features into view. At the time depicted in FIG. 5, the additional features 502 remain somewhat transparent or undefined on synthetic flight display 500; the additional features 502 are not fully displayed at their highest resolution yet. For this reason, FIG. 5 depicts the additional features 502 using dashed lines having a fine line weight. In contrast, due to the importance of the destination runway, synthetic flight display 500 renders runway 504 at a relatively high resolution and/or without any transparency.

Figure 6:
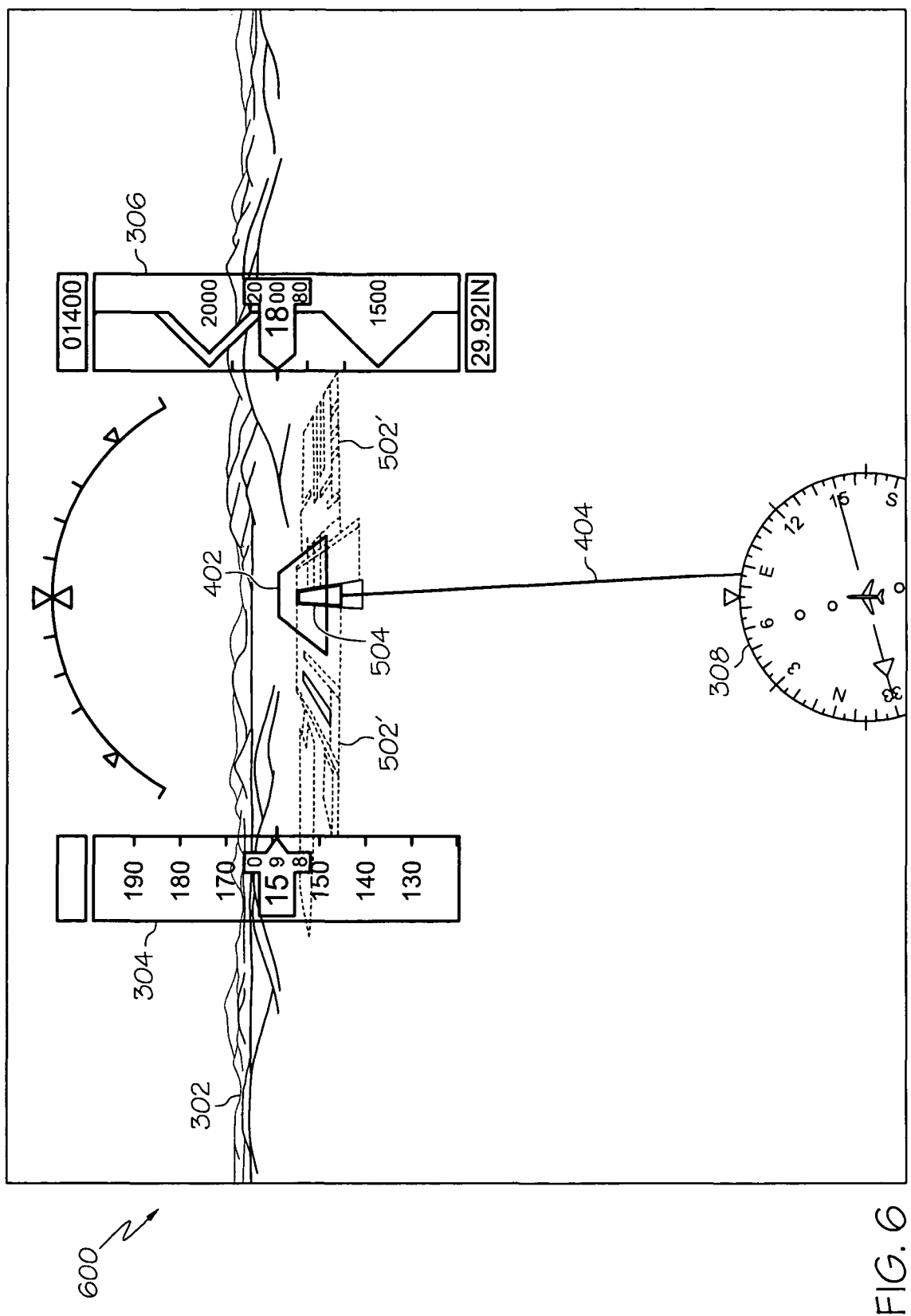

FIG. 6 depicts an exemplary synthetic flight display 600 at a time when the aircraft is about one-half mile away from the airport. For clarity and ease of illustration, some of the graphical elements shown in FIG. 3 are omitted from FIG. 6. At this time, landing area 402, runway approach path 404, the additional features 502', and runway 504 remain displayed (although their graphical representations have been updated to reflect the current geographic position of the aircraft). At this distance, the additional features 502' are rendered with enhanced detail, clarity, and/or resolution. However, at the time depicted in FIG. 6, the additional features 502' remain somewhat transparent or undefined on synthetic flight display 500; the additional features 502' are not fully displayed at their highest resolution yet. For this reason, FIG. 6 depicts the additional features 502' using dashed lines having a medium line weight. Although not explicitly shown in FIG. 6, the display system could continue to increase the number of visual features of the airport and/or runway. Thus, between the time corresponding to FIG. 5 and the time corresponding to FIG. 6, at least one trigger event has been detected in the aircraft status data, prompting the system to render the additional features 502' with more detail and/or resolution, or prompting the system to add further elements or features to the synthetic flight display.

Figure 7:
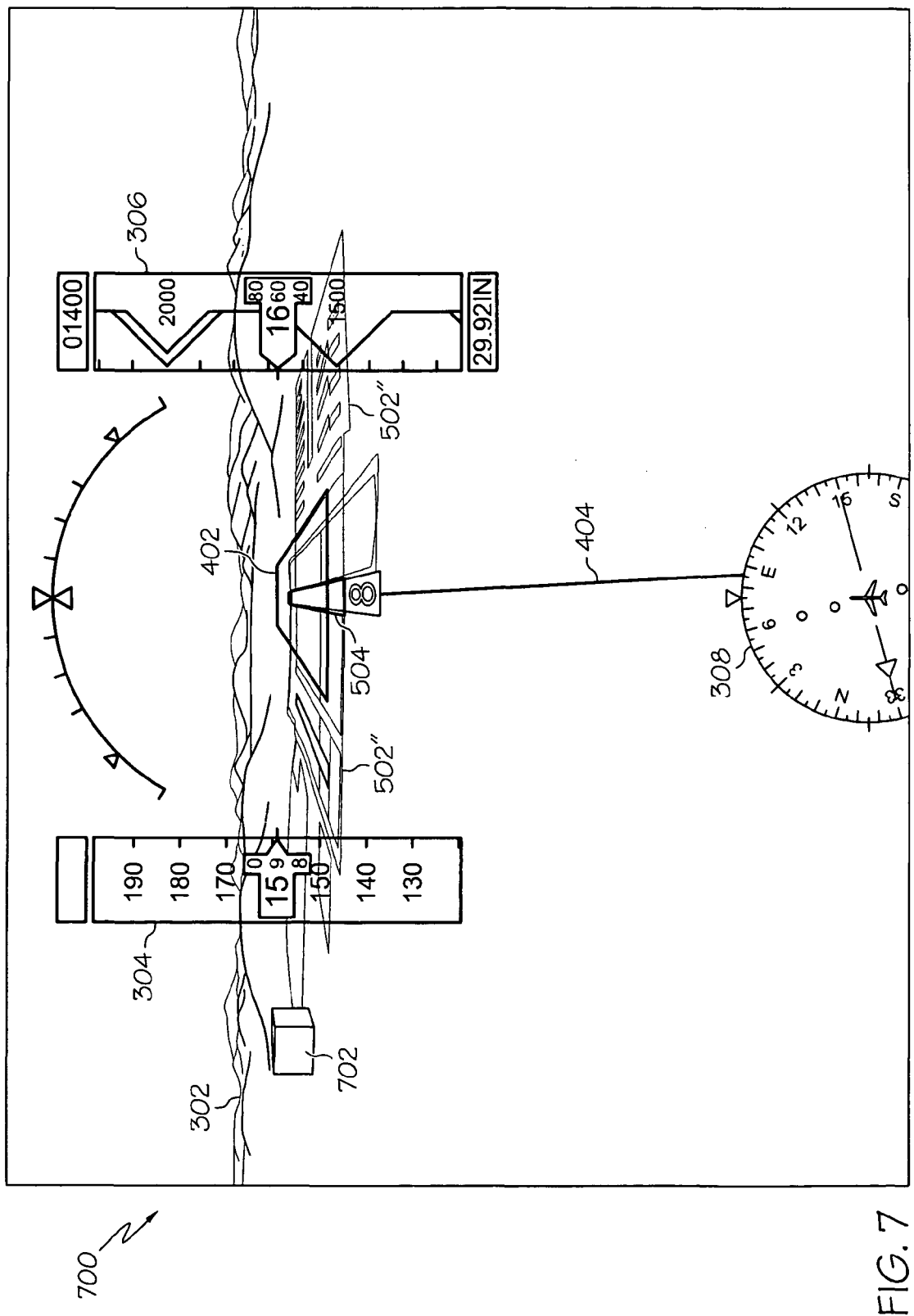

FIG. 7 depicts an exemplary synthetic flight display 700 at a time when the aircraft is about one-quarter mile away from the airport. For clarity and ease of illustration, some of the graphical elements shown in FIG. 3 are omitted from FIG. 7. At this time, landing area 402, runway approach path 404, the additional features 502", and runway 504 remain displayed (although their graphical representations have been updated to reflect the current geographic position of the aircraft). At this distance, the additional features 502" are rendered with yet further detail, clarity, and/or resolution. At this time, the additional features 502" may remain somewhat transparent or undefined on synthetic flight display 500, or they may be rendered at their highest resolution. For this reason, FIG. 7 depicts the additional features 502" using solid lines having a fine line weight.

At the distance to go depicted in FIG. 7, the display system could introduce other visual features of the airport and/or runway. For example, synthetic flight display 700 now includes a building 702 that does not appear on synthetic flight display 600. Moreover, synthetic flight display 700 also includes a runway marking (the number eight) on the end of runway 504. This runway marking was not rendered in synthetic flight display 600. Thus, between the time corresponding to FIG. 6 and the time corresponding to FIG. 7, at least one trigger event has been detected in the aircraft status data, prompting the system to render the additional features 502" with more detail and/or resolution, and prompting the system to add further elements or features to the synthetic flight display.

Figure 8:
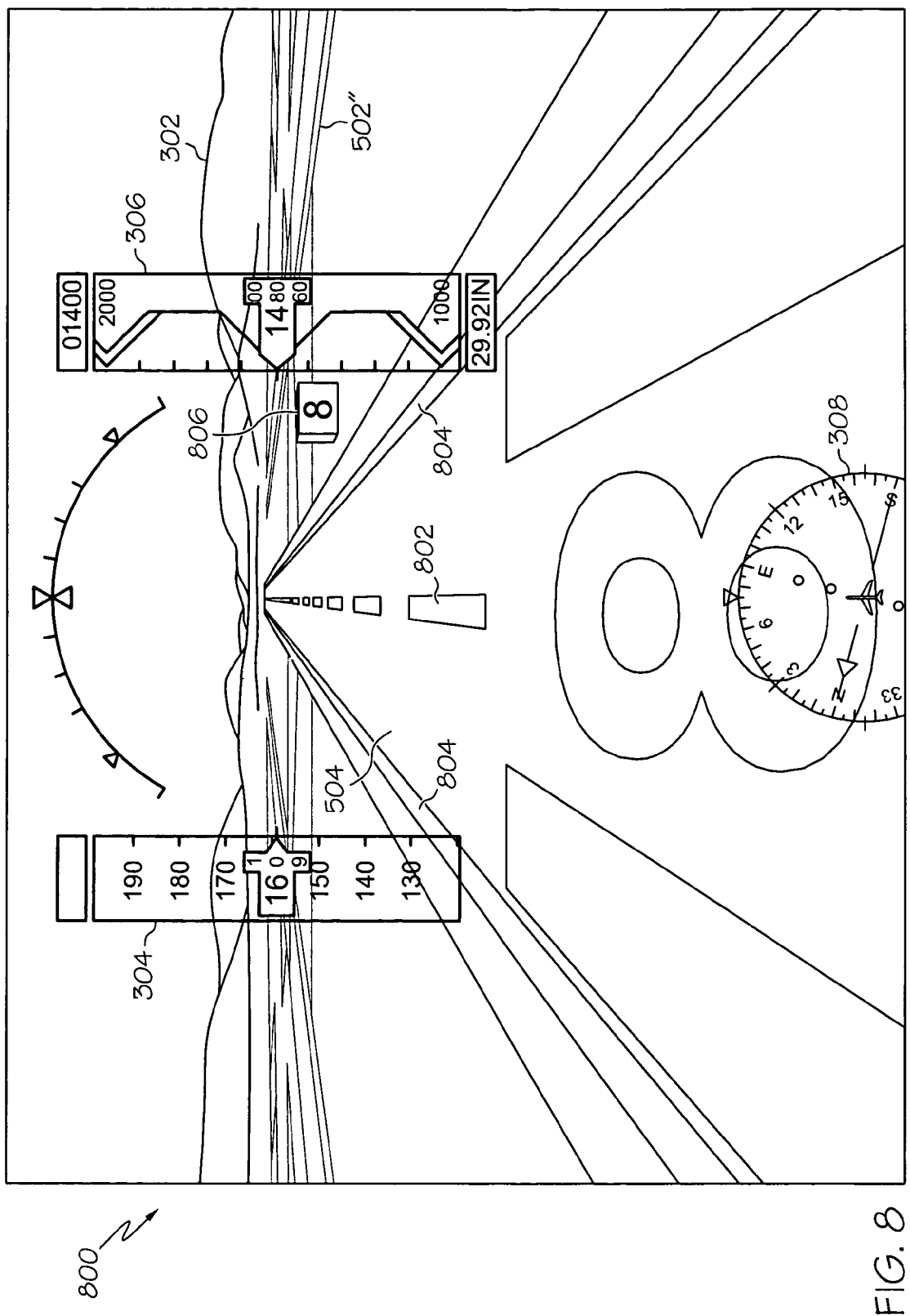

FIG. 8 depicts an exemplary synthetic flight display 800 at a time following touchdown of the aircraft. For clarity and ease of illustration, some of the graphical elements shown in FIG. 3 are omitted from FIG. 8. At this time, the additional features 502''' and runway 504 remain displayed (although their graphical representations have been updated to reflect the current geographic position of the aircraft). The additional features 502''' may be rendered at their highest resolution.

Notably, runway 504 is now rendered with realistic and accurate detail that includes a centerline marking 802 and sideline markings 804. At touchdown, the display system could introduce other visual features of the airport and/or runway. For example, synthetic flight display 800 now includes runway signage 806 that does not appear on synthetic flight display 700. Thus, between the time corresponding to FIG. 7 and the time corresponding to FIG. 8, at least one trigger event has been detected in the aircraft status data, prompting the system to render the additional features 502' at their highest level of detail and/or resolution, and prompting the system to add further elements or features to the synthetic flight display, such as runway signage 806.

Although the example described above relates to an approach maneuver, equivalent processing and display techniques can be applied in the context of other maneuvers, such as takeoff, in-flight maneuvers, or the like. Moreover, the techniques and technologies described herein can be utilized for fading or gradual rendering of features associated with any object, location, destination, geographic landmark, or item of interest. An airport represents merely one of many possible locations that could be the subject of the display techniques described above.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of displaying airport features on a flight deck display element of an aircraft, the method comprising:
   rendering a dynamic synthetic flight display on the flight deck display element during flight;
   receiving aircraft status data for the aircraft during flight, the aircraft status data including airspeed data that indicates airspeed of the aircraft during an approach that corresponds to a flight plan; and incrementally displaying graphical features of an airport in the dynamic synthetic flight display during the approach, such that the graphical features are added to the synthetic flight display at predetermined trigger events during the approach, wherein the trigger events correspond to different airspeed values indicated by the airspeed data.

2. The method of claim 1, further comprising the step of accessing airport feature data maintained onboard the aircraft, wherein the airport feature data is indicative of the features of the airport.

3. The method of claim 1, wherein the aircraft status data comprises flight data selected from the group consisting of: airspeed data; groundspeed data; attitude data; altitude data; pitch data; geographic position data; distance data indicative of a distance between the aircraft and the airport; roll data; turning rate data; heading data; environmental data; vertical speed data; radio altitude data; distance to another ground or air vehicle; aircraft track data; autoflight and autopilot status data; flap configuration data; spoilers or speed brake data; weight on wheels data; APU status data; aircraft lights data; parking brake status data; thrust parameter data; transponder status data; radar mode status data; landing gear status data; COM 1, COM 2 and COM 3 tuning data; distance to required track and distance to localizer data; deviation from desired track or localizer data; vertical distance to altitude pre-selector position; vertical time to next waypoint; time and distance to next waypoint; flight path angle data; throttle position data; trim settings; and body and earth accelerations.

4. The method of claim 1, wherein the step of incrementally displaying graphical features of the airport comprises the step of gradually fading-in an airport feature as a function of the aircraft status data.

5. The method of claim 1, wherein the step of incrementally displaying graphical features of the airport comprises incrementally displaying a plurality of airport features as a function of the aircraft status data.

6. The method of claim 5, wherein the plurality of airport features comprises items selected from the group consisting of: a runway; runway markings; runway signage; a taxiway; taxiway markings; taxiway signage; a ramp area; ramp area markings; a terminal; an air traffic control tower; a building located at or near the airport; a landscape feature located at or near the airport; a structure located at or near the airport; a fence; a wall; a vehicle located at or near the airport; another aircraft located at or near the airport; a light pole located at or near the airport; a power line located at or near the airport; a telephone pole located at or near the airport; an antenna located at or near the airport; parking guidance lines; parking stand lines; a concourse; construction equipment; a construction area located at or near the airport; trees; structures located around the airport perimeter; and bodies of water located at or near the airport.

7. A flight deck display system for an aircraft, the system comprising:

a first data source of visual feature data that is indicative of visual features of a location of interest;

a second data source of flight data for the aircraft, the flight data including airspeed data that indicates airspeed values of the aircraft;

a navigation system to obtain a programmed flight plan for the aircraft, the programmed flight plan having trigger events associated therewith, wherein the trigger events correspond to different airspeed values for the aircraft during an approach to the location of interest;

a processor architecture operatively coupled to the first data source and to the second data source, the processor architecture being configured to process the visual feature data, process the airspeed values, process the trigger events, and, based upon the visual feature data, the trigger events and the airspeed values, generate image rendering display commands; and a display element that receives the image rendering display commands and, in response thereto, renders a dynamic graphical representation of the location of interest using the visual feature data, wherein the dynamic graphical representation of the location conveys an amount of visible detail that varies data in response to the trigger events.

8. The system of claim 7, wherein the amount of visible detail corresponds to at least one visually distinguishable characteristic selected from the group consisting of: color; brightness; transparency level; translucency level; fill pattern; shape; size; flicker pattern; focus level; sharpness level; clarity level; shading; dimensionality; resolution; and outline pattern.

9. The system of claim 7, wherein the amount of visible detail corresponds to a number of visually distinct features of the location of interest.

10. The system of claim 7, wherein:

the location of interest is an airport; and the amount of visible detail increases as the aircraft approaches the airport.

\* \* \* \* \*